3,271,120
ALCOHOL FUEL GELS
Garland George Corey, Milltown, N.J., assignor to Colgate-Palmolive Company, New York, N.Y., a corporation of Delaware
No Drawing. Filed Dec. 12, 1963, Ser. No. 329,996
8 Claims. (Cl. 44—7)

This invention relates to alcohol fuel gel compositions. More particularly, the invention is directed to stable alcohol fuel gels characterized by a particular combination of ingredients found to be stabilized against free liquid formation, as hereinafter described.

As is well known in the art, numerous alcohol fuel gel compositions have been proposed for use as solid fuels. However, in their use as fuels it is desirable that there not be substantial amounts of free liquid above the surface of the gel, that the gel's flame burn without the formation of soot and that the combustion of the gel be complete without any detrimental residue remaining. Unfortunately, many solidified alcohol gels liberate or exude substantial amounts of free liquid (i.e., syneresis occurs) which can be spilled or affect combustion by sputtering. Also, these gels may burn with a smoky flame which will cause the formation of undesirable soot and after combustion leave a substantial residue.

In accordance with the present invention there is provided a stable alcohol gel which meets the above requirements and which comprises a major proportion of lower aliphatic alcohol, a nitrocellulose gelling agent about 15% to about 30% by weight of water and about 0.05% to about 0.3% by weight of an alcohol-soluble and water-soluble hydrated inorganic polyvalent metal nitrate salt.

The presence of the hydrated inorganic polyvalent metal nitrate salt in said alcohol-water-nitrocellulose gel has been found to render said instant alcohol fuel gels particularly more stable toward exudation of free liquids on aging than the same formulas from which said nitrate has been omitted. Furthermore, the action of these nitrate salts is unique, and not only effectively reduce syneresis substantially (i.e. formation of free liquid) but their presence in the gel composition does not alter the burning rate or characteristics of the gel composition nor effect the chemical or physical stability of the product. Representative examples of such inorganic polyvalent metal nitrate salts are light metal nitrate hydrates such as aluminum nitrate nona-hydrate, magnesium nitrate hexahydrate and heavy metal nitrate hydrates such as cupric nitrate trihydrate and cobalt nitrate hexahydrate. Also suitable non-hydrated nitrates may be employed provided they are dissolved or dispersed satisfactorily in the aqueous alcohol product and form the hydrate in situ without substantial adverse effect on the desired properties.

Accordingly, the compositions of the present invention are characterized by the formation of a stronger gel structure. By "stronger gel structure" it is meant that liquid entrapment is more efficient than in an alcohol-nitrocellulose-water gel. In a nitrocellulose gel the liquids, e.g. water and alcohol, are primarily trapped within the nitrocellulose fibers by mechanical means rather than bound by cohesion, polarization or the like and exuding of liquid can readily occur in the course of normal storage and/or use. The utilization of the polyvalent metal nitrate salts of this invention in the gel composition provides a stronger gel network. The exact reasons for this phenomenon are not fully understood and may be due to some structural change in the gel network. As used herein, the term "stable alcohol gel" refers to a firm, smooth gel wherein the amount of free liquid is decreased, i.e. not exuded as free liquid over an extended period of time, e.g. 90 days at room temperature and 4 days at 120° F. Thus, in normal storage the alcohol gel compositions will not have undesirable amounts of free liquid above the surface of the gel. Also, substantially no weight loss occurs.

The alcohols which can be employed in preparing the gel compositions of the present invention include monohydroxy alcohols which exhibit the required properties of combustibility and form firm gels when gelled wih nitrocellulose. Accordingly, the term "alcohol" as employed herein and in the appended claims is to be understood to include any monohydroxy alcohol which forms a gel of the desired firmness with water and the nitrocellulose; which gel burns with heat of acceptable intensity and leaves little residue after burning. Such compounds include aliphatic alcohols having one to four carbon atoms in the molecule such as methanol, ethanol, propanol, isopropanol, butanol, isobutanol when fuel gels having good characteristics of combustiiblity with substantially smokeless, soot-free burning are desired. On the other hand, where the requirements pertaining to the amount of soot produced are less stringent as, for example, when the fuel gels are employed for outdoor use, higher molecular weight monohydroxy alcohols such as pentanols and hexanols can be utilized so long as they are used in concentrations which do not impair the basic requirements of a solid fuel and form a stable gel with the water, nitrocellulose gelling agent and the polyvalent metal nitrate salts defined herein, and have the desired combustibility to suit the particular use. Although the alcohols used are generally anhydrous, they can be diluted with a suitable amount of water or other diluent at any desired stage. When a dilute alcohol is used, it is understood that it will not contain so much diluent that it interferes with combustion nor should the diluent be in such proportions as to prevent the nitrocellulose from being dissolved. Generally, it is preferred that the gels of the fuel gel composition of the present invention contain at least 70% of alcohol when the diluent is water.

Although excellent fuel gel compositions are made by using a single alcohol such as methanol or ethanol or propanol, a mixture of two or more alcohols can be utilized, and the term alcohol as used herein is intended to include mixtures also. When such is the case, the mixture of alcohols can be in any proportion as long as the total alcoholic content of the gel is sufficient to provide acceptable properties of combustibility. An excellent fuel gel can be prepared which burns with a substantially smokeless and soot-free flame when a mixture of ethanol and methanol is used and the methanol is present in an amount of at least 50% by weight, based on the total weight of the composition. The total alcoholic content in the gel compositions of the present invention can be in amounts from about 65% to about 80% by weight, based on the total weight of the composition.

There may be added other solvents or diluents as desired, particularly in the production of gels substantially free of methanol. For example, in the preparation of the gels containing essentially alcohols of 2 to 4 carbons, it is preferred to employ an auxiliary solvent to insure the dissolving of the nitrocellulose such as the use of ketones having up to about 4 carbon atoms in a minor amount, e.g. acetone, methylethyl ketone and the like. The preferred ketones, when present, are employed up to about 10%, and usually about 2 to 10% by weight for significant auxiliary solvent action.

The gelling agent is nitrocellulose which is a cellulose nitrate having a nitrogen content from about 11.8 to 12.2% and has any suitable viscosity, preferably in the range from about 25 seconds to about 400 seconds. The nitrocellulose is employed in a minor amount which is sufficient to form a gel with the alcohol, water and metal salt. Generally, the nitrocellulose is present in the fuel gel composition in a range from about 1% to about 4% by weight, based on the total weight of the composition though lower or higher amounts, such as up to about 10%, may be employed provided the formation of a gel is obtained having the desired properties.

The stabilizing agent, i.e., the agent which effectively reduces syneresis is an alcohol soluble and water-soluble hydrated inorganic polyvalent metal nitrate salt and particularly advantageous are the nitrate hydrates of aluminum, copper, magnesium and cobalt. This polyvalent metal nitrate hydrate salt constituent of the instant gel compositions is present in a small but effective amount sufficient to stabilize effectively the gel structure against exudation of free liquid but less than that amount which would adversely effect the gel surface, i.e. from about 0.05% to about 0.3% and preferably from about 0.05 to about 0.15% by weight of the composition. However, the amount of such salt which may be utilized is limited by the fact that above a certain level, about 0.4%, the nitrate salt tends to convert the gel from a film gel to an undesirable mush which indicates that the liquid entrapment is not effective for a stable homogenous gel network.

The fuel gel compositions of the invention also have water utilized therein. Generally, the water is present in the range of about 15% to about 30% by weight, based on the total weight of the composition, in order to develop a good gel structure. Amounts of water significantly in excess of about 30% by weight are undesirable since the combustible properties would be adversely affected, i.e. excessive amounts of water affect combustion in that the fuel gel would not ignite easily, if at all. Water in amounts substantially less than about 15% by weight are undesirable since all of the nitrocellulose is not precipitated, i.e. "shocked" by the water to give a firm, rigid gel. By the term "shocked" it is meant the amount of water which will deteriorate the solvent power of the methanol or alcohol and acetone and leads to a flocculation type of gelation. As a preferred range, about 18% to about 28% is in the fuel gel composition for the most effective reduction of syneresis.

The new alcohol gel composition of the invention can also have optional ingredients incorporated therein in suitable amounts. Such constituents include denaturants, dyes and other adjuvants. For example, a dye can be used for the purpose of identification or esthetic value. Generally, the dye is utilized in very small amounts such as about 0.004%. Such optional ingredients are normally present in the compositions in amounts of 1% each or less.

In addition to the foregoing components, various preservatives or stabilizers for nitrocellulose, e.g. urea and diphenyl amine can be incorporated in the present compositions in minor proportions. If desired, when the requirements relating to the production of soot are less stringent, suitable minor proportions of other combustible fuels, e.g. hydrocarbons such as benzol, gasoline, mineral spirits and the like can also be incorporated in the fuel gel compositions.

The fuel gel compositions disclosed and claimed herein can be prepared in a relatively simple manner. As the preferred method, nitrocellulose is wetted with a solvent such as methanol, acetone and the like to form a base mix or nitrocellulose solution. Thereafter, a collodion mix is prepared by the addition of alcohol to the nitrocellulose solution at room temperature. Where ethanol is used in the examples, the usual specially denaturated grade known in the art is generally employed. The polyvalent metal nitrate salt stabilizing agent is blended with the collodion mix and water is subsequently added at room temperature whereupon a gel is formed. Where optional ingredients are desired, they are usually blended with the collodion mix prior to the addition of the water.

The following examples are given to illustrate the present invention more fully but are not to be regarded as limiting. All amounts and percentages in the specification and claims will be by weight unless otherwise indicated.

*Example I*

A fuel gel composition was prepared having the following formulation:

| | Percent |
|---|---|
| Nitrocellulose | 1.890 |
| Acetone | 3.040 |
| Ethanol | 68.916 |
| Dye and denaturant | 0.004 |
| Aluminum nitrate (nona-hydrate) | 0.100 |
| Water | 26.050 |
| | 100.000 |

This nitrocellulose alcohol fuel gel was prepared as described from a base mix containing:

| Component: | Weight percent |
|---|---|
| Ethanol anhydrous | 82.403 |
| Nitrocellulose [1] | 8.232 |
| Acetone | 9.365 |

[1] Nitrogen content 11.8 to 12.2%. Viscosity of 12.2% solution—30 to 40 seconds.

A "finished collodion" mix was prepared from the base mix having the following composition:

| Component: | Weight percent |
|---|---|
| Base mix | 43.378 |
| Anhydrous ethanol | 36.616 |
| Ethanol (7% water) | 20.000 |
| Dye and denaturant | 0.006 |

Aluminum nitrate (nona-hydrate) was dissolved in the finished collodion mix and then the collodion mix was gelled by the addition of water.

| Component: | Weight percent |
|---|---|
| Finished collodion mix | 74.9–79.9 |
| Aluminum nitrate (nona-hydrate) | 0.1000 |
| Water | 20–25 |

After storage at 78° F. for 125 days, this fuel gel had less than 0.3% free liquid. When ignited, these gels burn readily with little, if any, sputtering; the flame is non-smoky and soot-free and the gel retained its shape throughout the period of combustion. Furthermore, there are not any substantial residue.

*Examples II–III*

Additional fuel gels containing hydrated polyvalent metal nitrate salts as set forth by the following formulations were prepared in a manner similar to Example I:

| Component | II | III |
|---|---|---|
| | Percent | Percent |
| Nitrocellulose (viscosity 30–40 seconds) | 1.890 | 1.890 |
| Acetone | 3.040 | 3.040 |
| Ethanol | 68.916 | 70.916 |
| Dye and denaturant | 0.004 | 0.004 |
| Water | 26.050 | 24.050 |
| Copper nitrate trihydrate | 0.100 | |
| Aluminum nitrate nona-hydrate | | 0.100 |
| Percent free liquid after 90 days at 78° F | Less than 0.3 | |
| Percent free liquid after 90 days at 78° F | | Less than 0.3 |

*Example IV*

A fuel gel composition was prepared having the following formulation:

| | Percent |
|---|---|
| Nitrocellulose | 2.400 |
| Methanol | 51.899 |
| Ethanol | 25.598 |
| Dye and denaturant | 0.003 |
| Aluminum nitrate (nona-hydrate) | 0.100 |
| Water | 20.000 |

The fuel gel was prepared from a base mix containing

| Component: | Percent |
|---|---|
| Methyl alcohol | 93.650 |
| Nitrocellulose[1] | 6.350 |

[1] Nitrogen content 11.8% to 12.2%; viscosity of 12.2% solution—250 to 400 seconds.

A "finished collodion" mix was prepared from the base mix having the following composition:

| Component: | Percent |
|---|---|
| Base mix | 67.683 |
| Ethanol | 32.314 |
| Dye and denaturant | 0.003 |

From the "finished collodion" mix the fuel gel composition was made to have the composition given above by dissolving aluminum nitrate in the "finished collodion" mix and adding water to gel the collodion mix.

| Component: | Percent |
|---|---|
| Finished collodion mix | 79.90 |
| Aluminum nitrate (nona-hydrate) | 0.10 |
| Water | 20.00 |

This fuel gel is stable without substantial amounts of free liquid and has the desired combustible properties.

*Examples V–VI*

Fuel gel compositions were prepared in a manner similar to Example IV and had the following formulations:

| Component | V | VI |
|---|---|---|
| | Percent | Percent |
| Nitrocellulose (viscosity 250-400 seconds) | 2.400 | 2.400 |
| Methanol | 51.899 | 51.898 |
| Ethanol | 25.598 | 25.599 |
| Dye and denaturant | 0.003 | 0.003 |
| Copper nitrate trihydrate | 0.100 | |
| Cobalt nitrate hexahydrate | | 0.100 |
| Water | 20.000 | 20.000 |

The exact means by which reduction in syneresis of the nitrocellulose-alcohol-water gel and the other advantageous properties are accomplished by inclusion of said inorganic polyvalent metal nitrate hydrate salt compounds is not known. Although the invention is not limited thereto, the excellent properties of the product are attributed to a possible complexing of the nitrocellulose by the inorganic polyvalent metal nitrate hydrate resulting in a three dimensional gel network.

From the foregoing description of the present invention, those skilled in the art will recognize that the present invention provides a stable composition comprising said alcohol (including mixtures) as the major component, a nitrocellulose gelling agent in amount sufficient to form a gel, i.e., about 1% to 4%, about 15 to 30% water and about 0.05% to about 0.3% of said hydrated inorganic polyvalent metal nitrate salt. Those skilled in the art will understand that other fuels, dyes, denaturants, preservatives and the like also can be mixed with the basic components of the mixture.

The compositions of the present invention are stable and well adapted to be packaged in bulk form and/or in cube form. They ignite easily, burn with an intense flame with little, if any, smoke or soot, remain firm during combustion and do not leave a detrimental residue. They have excellent stability and can be stored for prolonged periods without any significant free liquid formation.

Numerous variations and modifications of the embodiments of this invention may be made without departing from its spirit or scope. Accordingly, the invention is not to be restricted to the specific embodiments set forth herein except as defined in the appended claims.

What is claimed is:

1. A stable alcohol gel composition comprising a major proportion of a lower aliphatic monohydroxy alcohol, a nitrocellulose gelling agent, about 15% to about 30% by weight water and about 0.05% to about 0.3% by weight of an alcohol-soluble and water-soluble hydrated inorganic polyvalent metal nitrate salt.

2. A stable alcohol gel composition comprising by weight, based on the total weight of the composition, about 65% to about 80% of a lower aliphatic monohydroxy alcohol containing from 1 to 4 carbon atoms, about 1% to about 4% nitrocellulose, about 15% to about 30% water and about 0.05% to about 0.3% of an alcohol soluble and water-soluble hydrated inorganic polyvalent metal nitrate salt.

3. A stable alcohol gel composition comprising by weight, based on the total weight of the composition, about 65% to about 80% of an alcoholic mixture comprising methyl alcohol and ethyl alcohol, said methyl alcohol constituting at least 50% by weight of the total weight of the composition, about 1% to about 4% nitrocellulose, about 15% to about 30% water and about 0.05% to about 0.3% of alcohol-soluble and water-soluble inorganic polyvalent metal nitrate hydrate.

4. A stable alcohol gel composition comprising by weight, based on the total weight of the composition, about 65% to about 80% of a lower aliphatic monohydroxy alcohol containing from 1 to 4 carbon atoms, about 1% to about 4% nitrocellulose, about 18% to about 28% water and about 0.05% to about 0.3% alcohol-soluble and water-soluble hydrated polyvalent metal nitrate selected from the group consisting of aluminum nitrate, magnesium nitrate, copper nitrate and cobalt nitrate hydrated salts.

5. A gel in accordance with claim 4 wherein said alcohol is ethanol with up to about 10% acetone as an auxiliary solvent.

6. A stable alcohol gel composition comprising by weight, based on the total weight of the composition, about 65% to about 80% of an alcoholic mixture comprising methyl alcohol and ethyl alcohol, said methyl alcohol constituting at least 50% by weight of the total weight of the composition, about 1% to about 4% nitrocellulose, about 18% to about 28% water, and about 0.05% to about 0.3% alcohol soluble and water-soluble hydrated polyvalent metal nitrate selected from the group consisting of aluminum nitrate, magnesium nitrate, copper nitrate and cobalt nitrate hydrated salts.

7. A stable alcohol gel composition comprising by weight, based on the total weight of the composition, about 65% to about 80% of a lower aliphatic monohydroxy alcohol containing from 1 to 4 carbon atoms, about 1% to about 4% nitrocellulose, about 18% to about 28% water and about 0.05% to about 0.15% aluminum nitrate nona-hydrate.

8. A stable alcohol gel composition comprising by weight based on the total weight of the composition about 65% to about 80% of an alcoholic mixture comprising methyl alcohol and ethyl alcohol, said methyl alcohol constituting at least 50% by weight of the total weight of the composition, about 1% to about 4% nitrocellulose, about 18% to about 28% water and about 0.05% to about 0.15% aluminum nitrate nona-hydrate.

References Cited by the Examiner

UNITED STATES PATENTS

| 665,792 | 1/1901 | Luck et al. | 44—7 |
| 2,001,070 | 5/1935 | Shankweiler et al. | 44—7 |
| 3,072,467 | 1/1963 | Wiczer | 44—7 |

DANIEL E. WYMAN, *Primary Examiner.*

C. F. DEES, *Assistant Examiner.*